United States Patent Office 3,095,366
Patented June 25, 1963

3,095,366
INSULATING OIL
Richard D. Schieman, Avon Lake, Ohio, assignor to The Standard Oil Company, Cleveland, Ohio, a corporation of Ohio
No Drawing. Filed Mar. 3, 1960, Ser. No. 12,517
1 Claim. (Cl. 208—14)

This invention relates to insulating oils, in particular to transformer and switch oils.

Insulating oils, especially transformer oils, have two principal functions; (1) to act as an electric insulating medium, and (2) to carry heat generated in the windings and core of the transformer or other circuits to cooling surfaces. This double function means that insulating oils have to meet exacting operating requirements. The dielectric strength of these oils must meet a certain standard; and, furthermore, in order that the oil will have a good cooling effect, the viscosity must be kept within certain prescribed limits. In order to meet these desiderata, a transformer oil should have the following specifications:

Physical properties:
    Gravity, ° API (min.)_____ 26.1
    Specific gravity, 60° F. (max.)_____ 0.898
    Flash point, ° F. (min.)_____ 275
    Pour point, ° F. (max.)_____ −50
    Color [1] (max.)_____ 1.0
    Vis. @ 100° F. SSU (max.)_____ 60
    Demulsibility (W) (max.), secs_____ 35
    Interfacial tension (min.), dynes/cm_____ 40.0
Chemical properties:
    Neutral. value, mg.$^{KOH}$/gram oil (max.)____ 0.03
    Free or combined corrosive sulfur (max.)___ 3
    Inorganic chlorides or sulfates_____ None
Electrical properties:
    Power factor (max.)_____ 0.1
    Dielectric strength (min.)_____ 26,000
Oxidation stability: Hrs. to 15.0 IFT or failure (min.) _____ 72
Moisture content (max.)_____ 40.0

[1] ASTM–D–155.

Oils derived from crude petroleum oil have been used extensively by the prior art for the manufacture of transformer oils. However, most of these oils tend to undergo detrimental alterations depending upon their geographical origin. The principal drawback of most petroleum oils in connection with their use as transformer oils is a lack of oxidation stability. It is widely believed that highly refined viscous petroleum oils of the type otherwise suitable for use as transformer oils, although very stable against oxidation at atmospheric temperatures, tend to absorb atmospheric oxygen when heated, particularly when in contact with catalytic metals such as copper, which leads to the formation of undesirable acids in the oil. Such oils are, therefore, unsuitable for use as transformer oils.

It has now been discovered that a certain class of highly refined viscous petroleum oils possess unusually good oxidation stability. As a matter of fact, these oils possess oxidation stability which surpasses the requirements for a transformer oil. For the reasons mentioned above, it is unexpected that an oil of this type would meet the requirements for a transformer oil. The class of oils which possess this unusually good oxidation stability are lubricating oils prepared from the so-called "decanted oils" which are obtained from catalytic cracking operations.

In the catalytic cracking operation the total cracked products are removed from a cracking zone and are conducted to a product fractionator. This fractionator is operated to separate the cracked products into materials of different boiling ranges. The bottom product obtained from the fractionator will always contain a small percentage of catalyst particles which are carried over from the catalytic cracking zone. It is usually desirable to remove these catalyst particles before the oil can be subjected to further treatment and the removal of the catalyst particles may be conveniently accomplished in a decanting zone wherein the catalyst particles are permitted to separate from the oil by means of gravity; hence, the term decanted oil. The decanted oil usually comprises that fraction of the cracked products boiling in the range of about 500–1100° F.

In order to render the decanted oil suitable for use as a transformer oil it is necessary to subject the oil to conventional lubricating oil refining techniques such as solvent extraction and dewaxing. One method of accomplishing the refining of decanted oil is described in U.S. Patent 2,660,552 to Blanding. Lubricating oils of the type produced in accordance with the teachings of this patent are eminently suited for use as base stocks for the transformer oils of this invention.

In brief, the transformer oils of this invention comprise a substantial amount of a refined decanted oil and the remainder a highly naphthenic lubricating oil of the type obtained from the so-called Coastal crudes. The composition of this invention may also contain minor amounts of conventional chemical additives such as pour depressants, oxidation inhibitors, and the like.

It has been pointed out above that the oils obtained by refining the so-called decanted oils possess unusually good oxidation stability and it is this property which makes the oils desirable as transformer oils. However, the refined products obtained from decanted oil in an undiluted form will not meet all of the requirements for a transformer oil. More particularly, the pour points of these oils which are on the order of 0 to −5° F. are too high. However, it has been found that if the oil is mixed with a minor amount of highly naphthenic lubricating oil, such as those obtained from Coastal crudes which are known to have very low pour points, a satisfactory transformer oil will be obtained which possesses all of the beneficial properties which may be attributed to the decanted oil while at the same time meeting the other requirements of the transformer oils. The aforesaid highly naphthenic lubricating oils which form an ingredient of the compositions of this invention should have the properties in the following range:

Gravity, ° API_____ 20–30
    Viscosity @ 100° F. SSU_____ 50–70
    Pour point, ° F_____ Below −50
    Color [1] (max.)_____ 1
    Flash point, ° F. (min.)_____ 275

[1] ASTM–D–155.

Any highly naphthenic oil which meets the above requirements may be used in the compositions of this invention.

The product obtained from the decanted oil which forms the other ingredient of the compositions of this invention is preferably obtained by solvent extraction with furfural followed by dewaxing with a solvent such as by methylethyl ketone. In some instances, the oil must also be clay treated in order to meet the color and corrosivity specifications. However, the conditions under which these operations are conducted are not critical and form no part of this invention.

The refined decanted oils boiling in the range of about

500° F. to 800° F. appear to give the best results and they will have the following properties:

| | |
|---|---|
| Gravity, ° API | 35–40 |
| Viscosity @ 100° F. SSU | 30–80 |
| Flash point, ° F. (min.) | 275 |
| Color [1] (max.) | 1 |
| Pour point, ° F. | 0 to −5 |
| Oxidation stability: Hrs. to 15.0 IFT or failure | 300±20 |

[1] ASTM–D–155.

The transformer oils of this invention will comprise a substantial amount (e.g. 40% by volume) of the refined decanted oil and not more than 75% by volume. The remainder of the composition will be the highly naphthenic lubricating oil which may be present in amounts of at least 25% and not more than 60% by volume.

In order to illustrate the compositions of this invention, a transformer oil was prepared in accordance with the following description.

A full boiling range decanted oil was refined by furfural extraction, methylethyl ketone dewaxing, and clay contacting to give a finished lubricating oil. The 550 to 700° F. fraction of this oil had the following properties:

| | |
|---|---|
| Gravity, ° API | 36 |
| Viscosity @ 100° F. SSU | 60 |
| Flash point, ° F. | 330 |
| Pour point, ° F. | 0 |
| Color [1] | 1 |
| Oxidation stability: Hrs. to 15.0 IFT or failure | 300 |

[1] ASTM–D–155.

Fifty parts by volume of this oil were mixed with 50 parts by volume of a highly naphthenic lubricating oil. The naphthenic oil was prepared by acid treating and clay contacting a distillate derived from a Coastal crude oil and it had the following properties:

| | |
|---|---|
| Gravity, ° API | 25 |
| Viscosity @ 100° F. SSU | 55 |
| Flash point, ° F. | 295 |
| Pour point, ° F. | −70 |
| Color [1] | 1 |
| Oxidation stability: Hrs. to 15.0 IFT or failure | 200 |

[1] ASTM–D–155.

The final mixture of the two oils had the following properties:

Physical properties:

| | |
|---|---|
| Gravity, ° API | 31 |
| Specific gravity, 60° F. | 0.8713 |
| Flash point, ° F. | 335 |
| Pour point, ° F. | −50 |
| Color [1] | 1 |
| Viscosity @ 100° F. SSU | 57 |
| Demulsibility (W), secs. | 15 |
| Interfacial tension, dynes/cm. | 42 |

Chemical properties:

| | |
|---|---|
| Neutral. value, mg.$^{KOH}$/gram oil | 0.017 |
| Free or combined corrosive sulfur | 1 |
| Inorganic chlorides or sulfates | None |

Electrical properties:

| | |
|---|---|
| Power factor | <0.02 |
| Dielectric strength | 30,000+ |
| Oxidation stability: Hrs. to 15.0 IFT or failure | 310 |
| Moisture content | 35 |

[1] ASTM–D–155.

A comparison of the properties of the above-identified oil with the specifications for a transformer oil which are set forth in column 1 of this specification shows that the above oil is admirably suited for use as a transformer oil inasmuch as all of the requirements for a transformer oil are fully met. It is noted particularly that the oxidation stability of the oil of the example is better than the oxidation stability of either of the constituent oils. This fact suggests that there is a synergistic effect between the refined decanted oil and the highly naphthenic oil, but in any event it is clear that the addition of the naphthenic oil to the decanted oil does not detract in any way from the oxidation stability of the decanted oil.

While the above example illustrates the advantages of the compositions of this invention, it is possible to prepare other compositions within the scope of this invention employing small amounts of conventional chemical additives. For example, pour depressants may be used to lower the pour point of the refined decanted oil which in turn will reduce the amount of the naphthenic oil which is necessary to meet the requirements of transformer oils. A particularly suitable class of pour point depressants are those sold under the trademark Paraflow and these additives are complex condensation products of paraffin wax and naphthalene prepared by chlorinating the wax and condensing same with naphthalene by the Friedel-Crafts reaction. Although the compositions of this invention possess extremely good oxidation stability, it may be desirable in some instances to increase the stability further. In the latter event conventional oxidation inhibitors such as dibutyl paracresol may be employed.

Another unusual aspect of the oils of this invention is their specific orientation polarization factor. The latter property affords a measure of the insulating properties of the oil. In general, a good insulating oil should have a specific orientation polarization factor of less than 0.0001. It is significant that the compositions of this invention have a specific orientation polarization factor of 0 which furnishes additional evidence of their suitability as insulating oils.

It will be obvious to those skilled in the art that various modifications may be made of the compositions of this invention without departing from the spirit or scope of the invention. Accordingly, this application for Letters Patent is intended to cover all such modifications as would fall within the scope of the appended claim.

I claim:

An insulating oil having a pour point below −50° F. and excellent oxidation stability consisting essentially of at least 40% by volume of a solvent refined and de-waxed catalytic cracker decanted oil boiling within the range of about 500° F. to about 800° F. and having a gravity (° API) within the range of 35–40, a viscosity @ 100° F. (SSU) within the range of 30–80, a minimum flash point of 275° F. and a pour point above 0° F. and the remainder, but not less than 25 vol. percent of the insulating oil, being a naphthenic oil distillate derived from a Coastal crude oil, said naphthenic oil having a pour point below −50° F.

References Cited in the file of this patent

UNITED STATES PATENTS

| | | |
|---|---|---|
| 2,725,345 | Binovic et al. | Nov. 29, 1955 |
| 2,780,581 | Macke et al. | Feb. 5, 1957 |
| 3,000,807 | Wasson et al. | Sept. 19, 1961 |

OTHER REFERENCES

"Chemical Constituents of Petroleum," by Sachanen, pages 228 and 240, Reinhold Pub. Corp., New York, 1945.